United States Patent
Du et al.

(10) Patent No.: US 11,441,837 B2
(45) Date of Patent: Sep. 13, 2022

(54) REFRIGERATOR WITH A MOVABLE SHELF OR STORAGE CONTAINER

(71) Applicant: BSH HAUSGERÄTE GMBH, Munich (DE)

(72) Inventors: Li Du, Nanjing (CN); Jing Hong, Nanjing (CN); Yu Xia, Nanjing (CN)

(73) Assignee: BSH Hausgeraete GmbH, Munich (DE)

( * ) Notice: Subject to any disclaimer, the term of this patent is extended or adjusted under 35 U.S.C. 154(b) by 315 days.

(21) Appl. No.: 16/672,765

(22) Filed: Nov. 4, 2019

(65) Prior Publication Data
US 2020/0173717 A1 Jun. 4, 2020

(30) Foreign Application Priority Data

Nov. 29, 2018 (CN) .......................... 201811439360.6

(51) Int. Cl.
*F25D 27/00* (2006.01)
*F25D 23/06* (2006.01)
*F25D 29/00* (2006.01)
*F25D 25/02* (2006.01)
*F25D 23/02* (2006.01)

(52) U.S. Cl.
CPC ......... *F25D 29/005* (2013.01); *F25D 23/021* (2013.01); *F25D 23/06* (2013.01); *F25D 25/025* (2013.01); *F25D 27/00* (2013.01)

(58) Field of Classification Search
CPC ........ F25D 23/021; F25D 23/06; F25D 27/00; F25D 27/005; F25D 29/00; F25D 29/005; F25D 29/025; F25D 2327/00; F25D 2327/001
See application file for complete search history.

(56) References Cited

U.S. PATENT DOCUMENTS

| | | | | |
|---|---|---|---|---|
| 5,177,976 A | * | 1/1993 | Lim ...................... | F25D 29/005 62/131 |
| 5,768,898 A | * | 6/1998 | Seok ...................... | F25D 27/00 62/132 |
| 2016/0112679 A1 | * | 4/2016 | Lee ....................... | F25D 29/005 312/7.2 |
| 2016/0153706 A1 | * | 6/2016 | Staedel ................. | F25D 27/00 312/407 |

FOREIGN PATENT DOCUMENTS

CN         104019615 A      9/2014

* cited by examiner

*Primary Examiner* — Jonathan Bradford
(74) *Attorney, Agent, or Firm* — Laurence A. Greenberg; Werner H. Stemer; Ralph E. Locher (57) ABSTRACT

A refrigerator includes a cabinet, a door, a storage container or movable shelf, and a video recording module. The cabinet includes a storage compartment, a pair of oppositely disposed side walls, and a connecting portion that extends along a lateral direction of the cabinet and that is connected to the pair of side walls, the connecting portion having a front engaging face. The door is configured to cover the storage compartment and is connected to the front engaging face when closed. The storage container or movable shelf is located in the storage compartment and may be at least partially pulled out of the storage compartment. The video recording module or an illumination module is disposed at the connecting portion, faces toward a front of the cabinet, and is inclined downward to record a video of/illuminate the storage container or movable shelf that is at least partially pulled out of the storage compartment.

16 Claims, 6 Drawing Sheets

REFRIGERATOR WITH A MOVABLE SHELF OR STORAGE CONTAINER

CROSS-REFERENCE TO RELATED APPLICATION

This application claims the priority benefit, under 35 U.S.C. § 119, of Chinese patent application CN 2018 114 39360, filed Nov. 29, 2018; the prior application is herewith incorporated by reference.

BACKGROUND OF THE INVENTION

Field of the Invention

The present invention relates to a refrigerator.

CN104019615B discloses a method for viewing food materials in a refrigerator, including: opening a storage container of a fresh food compartment of the refrigerator; triggering a camera disposed at a bottom of a cabinet door of a refrigerating compartment to work, and triggering an illuminating lamp disposed at the bottom of the cabinet door of the refrigerating compartment to illuminate, the camera recording a video of a storage container, and the fresh food compartment being located below the refrigerating compartment. The camera is turned off after the storage container is completely closed, and a control plate of the camera obtains, from video data that is of a last preset duration and taken by the camera before current closing of the storage container, a picture existing at a penultimate second before the storage container is closed or when the storage container is pulled out for a largest distance.

BRIEF SUMMARY OF THE INVENTION

It is an object of present invention to provide a refrigerator. More specifically, it is an object of the present invention to provide a refrigerator having a storage container or movable shelf that may be at least partially pulled out of a storage compartment.

In one aspect, the embodiments of the present invention relate to a refrigerator. The refrigerator includes: a cabinet including a storage compartment, a pair of oppositely disposed side walls, and a connecting portion that extends along a lateral direction of the cabinet and that is connected to the pair of side walls, the connecting portion having a front engaging face; a door, configured to cover the storage compartment, the door being connected to the front engaging face when closed; a storage container or movable shelf that is located in the storage compartment and that may be at least partially pulled out of the storage compartment; and a video recording module or an illumination module, where the video recording module or the illumination module is disposed at the connecting portion, faces toward a front of the cabinet, and is inclined downward to record a video of or illuminate the storage container or movable shelf that is at least partially pulled out of the storage compartment.

The video recording module or the illumination module is fixed to the cabinet to record a video of or illuminate the storage container or movable shelf located outside the storage compartment, thereby helping reduce a possibility that opening of an upper door impedes video recording or illumination of the video recording module or the illumination module in the prior art. Because the video recording module or the illumination module is disposed at the connecting portion, faces toward the front of the refrigerator, and is inclined downward, a video recording range or an illumination range can be increased.

It should be understood that, an implementation that the video recording module or the illumination module is disposed at the connecting portion, faces toward the front of the cabinet, and is inclined downward to record a video of or illuminate the storage container or movable shelf that is at least partially pulled out of the storage compartment may include an implementation that either the video recording module or the illumination module is disposed at the connecting portion, faces toward the front of the cabinet, and is inclined downward to record a video of or illuminate the storage container or movable shelf that is at least partially pulled out of the storage compartment, and may further include an implementation that the video recording module and the illumination module are disposed at the connecting portion, face toward the front of the cabinet, and are inclined downward to record a video of and illuminate the storage container or movable shelf that is at least partially pulled out of the storage compartment.

For example, in some embodiments, the video recording module is disposed at the connecting portion, faces toward the front of the cabinet, and is inclined downward to record a video of the storage container or movable shelf that is at least partially pulled out of the storage compartment. The refrigerator may have an illumination module for illuminating an opened drawer, and the illumination module is disposed, for example, at a bottom of another door located above the door.

For another example, in some embodiments, the illumination module may be disposed at the connecting portion, faces toward the front of the cabinet, and is inclined downward to illuminate the storage container or movable shelf that is at least partially pulled out of the storage compartment, and the refrigerator may be provided with a video recording module for recording a video of a drawer or provided with no video recording module.

In some embodiments, the illumination module and the video recording module may operate independently of each other or operate in association with each another. For example, the illumination module and the video recording module may operate independently of each other, and for another example, when an ambient brightness is insufficient, the illumination module may be used as an auxiliary illumination device for the video recording module. The video recording module and the illumination module may be separately mounted at the connection portion. For example, the video recording module and the illumination module may respectively have different carriers. In an alternative embodiment, the video recording module and the illumination module may be disposed on a same physical carrier.

In a possible embodiment, the connecting portion includes a mounting inclined wall, the mounting inclined wall facing toward the front of the cabinet and being inclined downward in a front-to-rear direction, and the video recording module or the illumination module being coupled to the mounting inclined wall.

In a possible embodiment, the connecting portion includes a recessed portion, the video recording module or the illumination module being located in the recessed portion.

In a possible embodiment, the recessed portion is recessed rearward from a front surface of the connecting portion.

In a possible embodiment, the recessed wall includes a lower wall, the lower wall being inclined upward in a front-to-rear direction.

In a possible embodiment, there is an interval between a rear portion of the door and the video recording module or the illumination module.

In a possible embodiment, there is a giving-way portion at a rear side of an upper end of the door, and the door has a reduced thickness at the giving-way portion.

In a possible embodiment, there is a surface inclined toward a direction away from the connecting portion at the rear side of the upper end of the door.

In a possible embodiment, the front engaging face is located below the video recording module or the illumination module.

In a possible embodiment, when the door is closed, the video recording module or the illumination module is located outside the storage compartment.

In a possible embodiment, a second door located above the door is included, the video recording module or the illumination module being at least partially located between the door and the second door in a vertical direction.

In a possible embodiment, the storage container or movable shelf is adapted to move in the front-to-rear direction with the door.

In a possible embodiment, a first sensor for detecting whether the storage container or movable shelf reaches a second location is included, a spacing existing between the second location and a first location, the storage container being closed or the movable shelf being at an end position within the storage compartment at the first location, and when the storage container or movable shelf reaches the second location along a predetermined direction, the video recording module or the illumination module being triggered to record a video of or illuminate the storage container or movable shelf.

In a possible embodiment, the first sensor is adapted to move with the storage container or movable shelf, or is located in the storage compartment and may move relative to the storage container or movable shelf.

In a possible embodiment, the second location is located between the first location and the second location, the storage container or movable shelf being in a maximum open state at a third location.

In a possible embodiment, the second location is close to the third location.

Other objectives and beneficial effects of the present invention become more apparent and easier to understand through description of preferred embodiments with reference to the accompanying drawings.

As a part of the description and for providing further understanding of the present invention, the following accompanying drawings are used to illustrate specific embodiments of the present invention, and are used to explain principles of the present invention with the description.

DETAILED DESCRIPTION OF THE INVENTION

Figure 1:
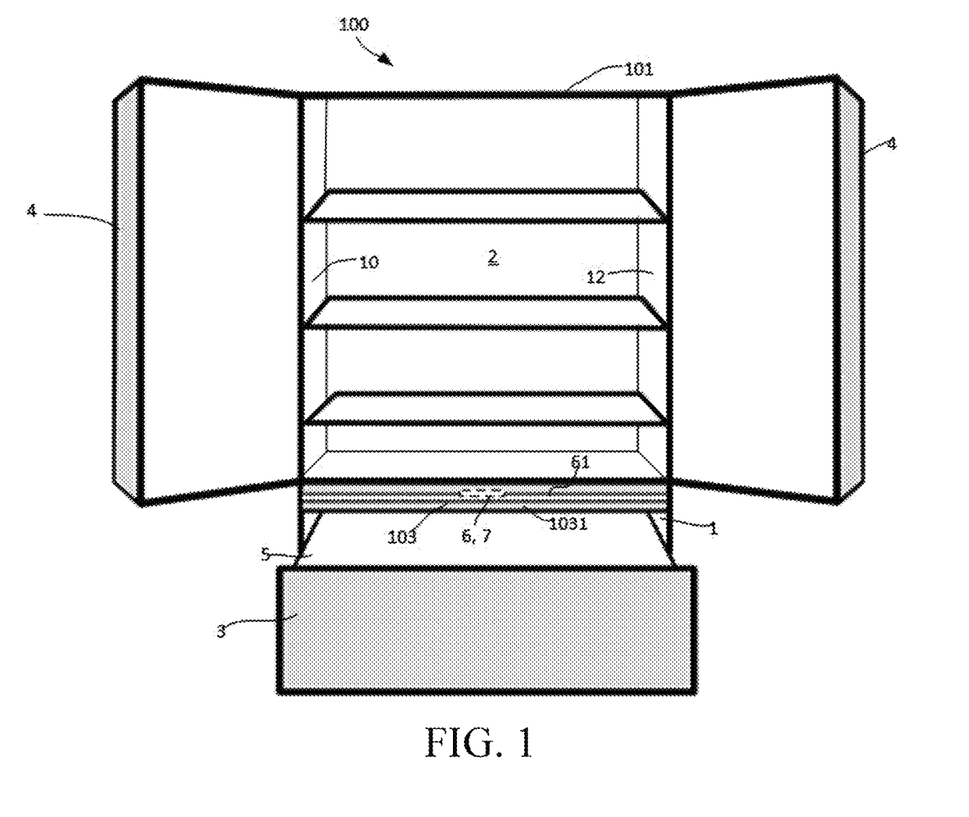
FIG. 1 is a schematic three-dimensional view of a refrigerator according to an embodiment of the present invention.
Figure 2:
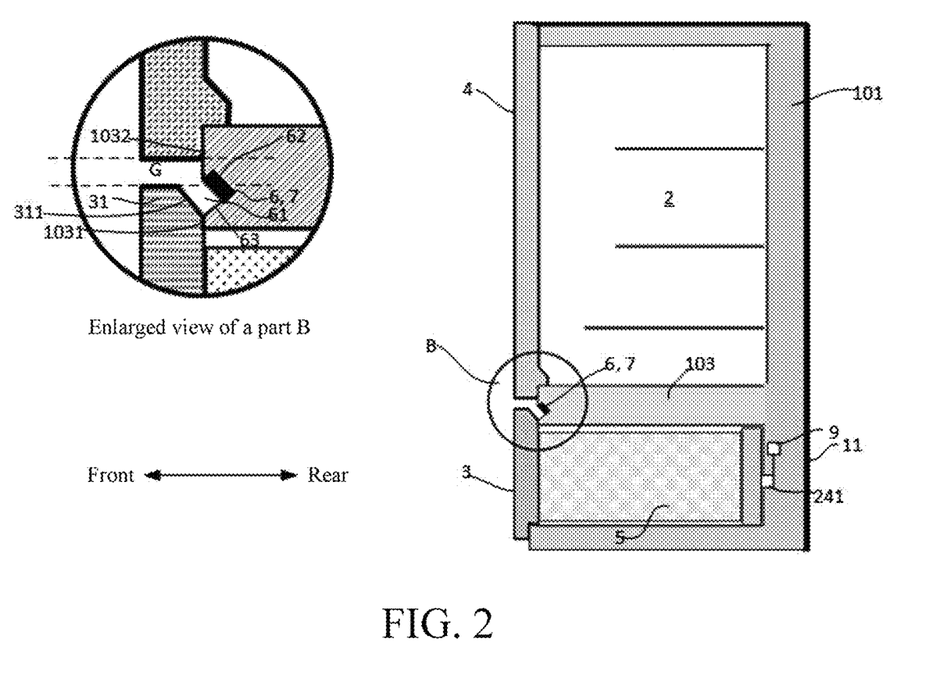
FIG. 2 is a schematic cross-sectional view of a refrigerator and a schematic enlarged view of a part B according to an embodiment of the present invention, where a storage container is at a first location.
Figure 3:
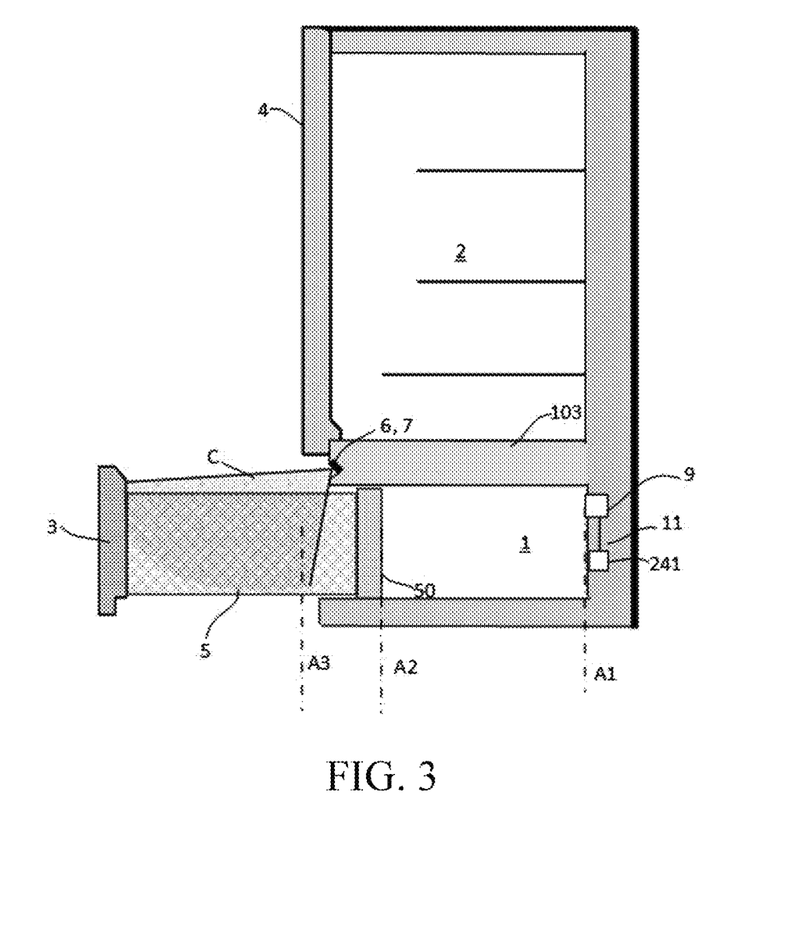
FIG. 3 is a schematic cross-sectional view of a refrigerator according to an embodiment of the present invention, where the storage container is at a second location.

Referring now to the figures of the drawing in detail and first, particularly, to FIGS. 1 to 3 thereof, there is shown a refrigerator 100 which includes a cabinet 101. The cabinet 101 includes a pair of oppositely disposed side walls 10, 12 and a connecting portion 103 that extends laterally and that is connected to the pair of side walls 10, 12. In this embodiment, the connecting portion 103 is a separation wall that separates a first storage compartment 1 and a second storage compartment 2. A heat-insulation material may be provided in the connecting portion 103.

The refrigerator 100 includes a door 3 to close a front opening of the first storage compartment 1. The second storage compartment 2 located above may be covered by a door 4.

A front end of the connecting portion 103 has a front engaging face 1031. When the door 3 is closed, an upper end of the door 3 is engaged with the front engaging face 1031.

In this embodiment, when the door 4 is closed, a rear side of the door 4 is engaged with an upper engaging face 1032 of the connecting portion 103.

In one embodiment, the door 3 may be connected to the pair of side walls 10, 12 through a pair of brackets (not shown), and may slide relative to the cabinet 101 in a front-to-rear direction.

The refrigerator includes a storage container 5. The storage container 5 is located in the first storage compartment 1 and may be at least partially pulled out of the first storage compartment 1.

The storage container 5 may be adapted to move in the front-to-rear direction with the door 3. For example, the storage container 5 may be directly or indirectly supported on a bracket to which the door 3 is fixed.

The storage container 5 may be provided without side walls then being a movable shelf. In this version the movable shelf may be adapted to move in the front-to-rear direction with the door 3. For example, the movable shelf may be directly or indirectly supported on a bracket to which the door 3 is fixed. Following embodiments can in similar manner be understood as comprising a movable shelf instead of a container.

The refrigerator 100 includes a video recording module 6 for recording a video of the storage container 5 that is at least partially pulled out of the first storage compartment 1. The video recording module 6 is provided at the connecting portion 103. The video recording module 6 is disposed in the following way: facing a front of the cabinet 101 and being inclined downward.

As shown in FIG. 3, the front end of the connecting portion 103 may include a recessed portion 61, the video recording module 6 being located in the recessed portion 61. The recessed portion 61 may be recessed rearward from a front surface of the connecting portion 103. A lid (not shown) may be provided at a front opening of the recessed portion 61 to cover the recessed portion 61.

In the embodiment shown in FIG. 1, the recessed portion 61 extends along an entire width of the connecting portion 103. It should be understood that, in an alternative embodiment, it is also possible that the front engaging face of the connecting portion 103 is provided with a recessed portion extending only along a partial width of the connecting portion 103.

As shown in FIG. 2, the connecting portion 103 includes a mounting inclined wall 62, the mounting inclined wall 62 being inclined downward along a front-to-rear direction to be inclined frontward and downward. The video recording module 6 is coupled to the mounting inclined wall 62.

The recessed portion 61 may include a lower wall 63 opposite to the mounting inclined wall, the lower wall 63 being inclined upward in a front-to-rear direction to be inclined frontward and upward. This helps enlarge a video recording range of the video recording module 6. In this embodiment, the recessed portion 61 has a section that is approximately "V".

In order to avoid a collision between the door 3 and the video recording module 6, there is an interval between a rear portion of the door 3 and the video recording module 6.

As shown in FIG. 3, the upper end of the door 3 has a reduced thickness at the corresponding video recording module 6, so that a giving-way portion 31 that retreats toward the front of the cabinet 101 in a bottom-to-top direction is formed. The giving-way portion 31 may include a rear surface 3311 that is located on an upper rear side of the door 3 and that is gradually inclined toward a direction away from the connecting portion 103.

As shown in FIG. 3, the front engaging face 1031 is located below the video recording module 6. The video recording module 6 is located outside the first storage compartment 1. The video recording module 6 may include a portion located in a gap G between the doors 3 and 4 in a vertical direction.

Figure 4:
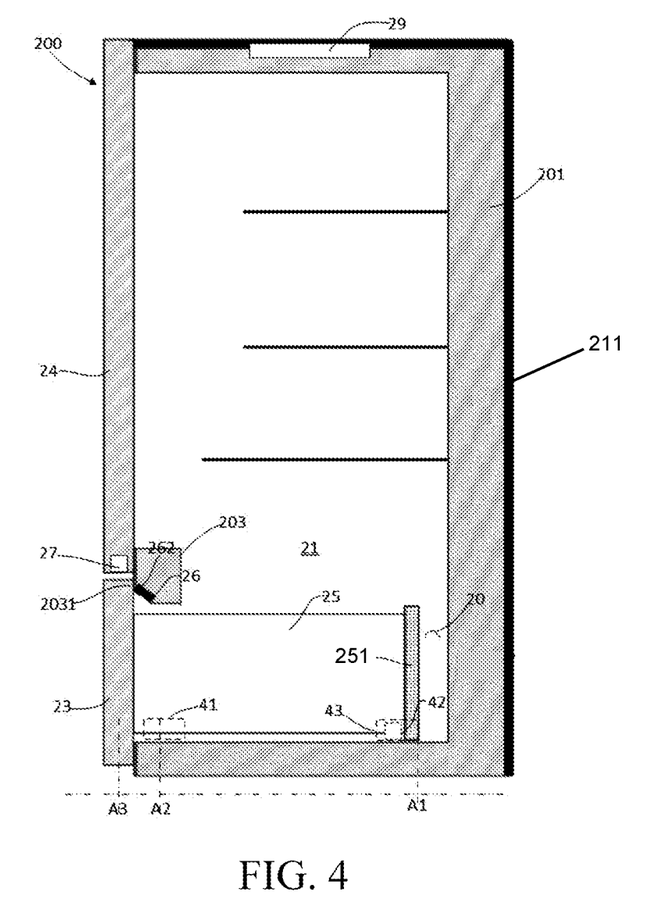
FIG. 4 is a schematic cross-sectional view of a refrigerator according to another embodiment of the present invention, where a storage container is at second location.

FIG. 4 is a schematic cross-sectional view of a refrigerator according to another embodiment of the present invention. As shown in FIG. 4, a refrigerator 200 includes a storage compartment 21 and a beam-like connecting portion 203 that connects a pair of side walls 20 of a cabinet 201. When a door 23 is closed, a rear side of the door 23 is engaged with a front engaging face 2031 of the connecting portion 203. A rear side of a door 24 can also be engaged with the front engaging face 2031 of the connecting portion 203.

The video recording module 26 is disposed at a front end of the connecting portion 203. The video recording module 26 faces toward a front of the refrigerator 200 and is inclined downward to record a video of a storage container 25 that is at least partially pulled out of a storage compartment 21.

The connecting portion 203 may have a mounting inclined wall 262 that is inclined downward in a front-to-rear direction, and the video recording module 26 is mounted to the mounting inclined wall 262.

The mounting inclined wall 262 may be located at a lower corner of the front end of the connecting portion 203. In this embodiment, the video recording module 26 is located below the front engaging face 2031. When the door 23 is closed, the video recording module 26 is located in the storage compartment 21.

The storage container 25 may move in a front-to-rear direction between a first location A1 and a third location A3. At the first location A1, the storage container 25 enters the storage compartment 1 and reaches a most rearward location, that is, the storage container 25 is closed at the first location A1. At the third location A3, the storage container 25 is opened with a maximum opening when moving to a rear wall 211 farthest from the storage compartment 21. At the third location, the storage container 25 may be completely withdrawn from the storage compartment 21. In some other embodiments, it is also possible that a portion of the storage container 25 is still located within the storage compartment 21.

In FIG. 4, relative locations of the first location A1 and the third location A3 are schematically shown using a rear wall 251 of the storage container 25 as a reference object. It should be understood that the relative locations of the first location and the third location may be shown using other parts of the storage container 25 as a reference object.

When the storage container 25 moves toward the third location A3, the storage container 25 moves along a direction in which the storage container is opened. When the storage container moves toward the first location A1, the storage container 25 moves along a direction in which the storage container is closed.

The refrigerator 200 includes a detecting unit. The detecting unit includes a first sensor 41 for detecting whether the storage container 25 reaches a second location A2, a spacing existing between the second location A2 and the first location A1. The first sensor 41 may be adapted to move with movement of the storage container 25. For example, the first sensor 41 is fixed to the storage container 25 or to parts such as a bracket or a guide rail that moves with the storage container 25. In an alternative embodiment, the first sensor 41 may also be fixed to a cabinet 201, and moves relative to the storage container 25 when the storage container 25 moves.

At the second location A2, an interior of the storage container 25 may be exposed to a video recording range (schematically shown by a shadow area C in the figure) of the video recording module 26 located above the storage container 25.

When the storage container 25 reaches the second location along a predetermined direction, the video recording module 26 is triggered to record a video of the interior of the opened storage container 25.

In this embodiment, the second location A2 may be between the first location A1 and the third location A3. The second location may be close to the third location.

The refrigerator 200 may include a trigger 42 that is disposed on the cabinet 201 or that may move with movement of the storage container 25. In particular, one of the first sensor 41 and the trigger 42 may move with movement of the storage container 25, and the other of the first sensor 41 and the trigger 42 is fixedly fixed to the cabinet 201, so that the first sensor 41 and the trigger 42 move relative to each other when the storage container 25 moves.

At the first location A1, the first sensor 41 is located outside a trigger range of the trigger 42, and at the second location A2, the first sensor 41 is triggered by the trigger 42. The first sensor 41 can generate a first signal. The first signal may be a state change of any component of the first sensor 41. The first signal may be, for example, a high level signal, a low level signal, a level signal change, opening or closing of an electrical device such as a switch or a relay.

For example, in some embodiments, the trigger 42 may include a generator 42 that can generate a physical quantity, and the first sensor 41 can sense the physical quantity at the second location to generate a first signal.

The physical quantity may be, for example, a magnetic field or light. Therefore, the trigger 42 may be, for example, a magnet that can generate a magnetic field or a light source that can generate light.

For another example, in some embodiments, the first sensor 41 may include a mechanical switch, and the trigger 42 may be a mechanical structure for changing a state of the mechanical switch. For example, when the storage container 25 is at the second location A2, the state of the mechanical switch is changed by the trigger 42. For example, the mechanical switch is pressed to be closed or opened.

In some embodiments, the detecting unit may further include a second sensor 43, the second sensor 43 being configured to detect whether the storage container 25 is at the first location A1.

The first sensor 41 and the second sensor 43 may be disposed apart in a direction of movement along the storage container 5.

The second sensor 43 may use a same principle as the first sensor 41 and has a similar structure. In some embodiments, the first sensor 41 and the second sensor 43 may share one trigger 42.

The second sensor 43 generates a second signal at the first location as a result of being triggered by the trigger 42. At the second location, the second sensor 43 is outside the trigger range of the trigger 42, and the first sensor 41 is triggered by the trigger 42 to generate a first signal.

The refrigerator 200 includes a control unit 29 adapted to receive feedback from the detecting unit, and the control unit 29 may control the video recording module 26 according to the feedback from the first sensor 41.

The control unit 29 may determine a moving direction based on feedback from the first sensor 41 and the second sensor 43 when the storage container 5 reaches the second location A2.

In some implementations, after receiving, from the second sensor 43, a second signal indicating that the storage container 25 is opened from the first location A1, when receiving, from the first sensor 41 for an even number of times after the current second signal, a first signal indicating that the storage container 25 moves to the second location A2, the control unit 29 may determine that the storage container 25 moves to the second location A2 along a direction in which the storage container is closed. After the current second signal, when the control unit 29 receives the first signal from the first sensor 41 for an odd number of times, the control unit 29 determines that the storage container 25 moves to the second location A2 in a direction in which the storage container is opened. When the control unit 29 receives the second signal again (that is, the storage container 5 is closed), a count of the first signal is cleared.

Figure 5:
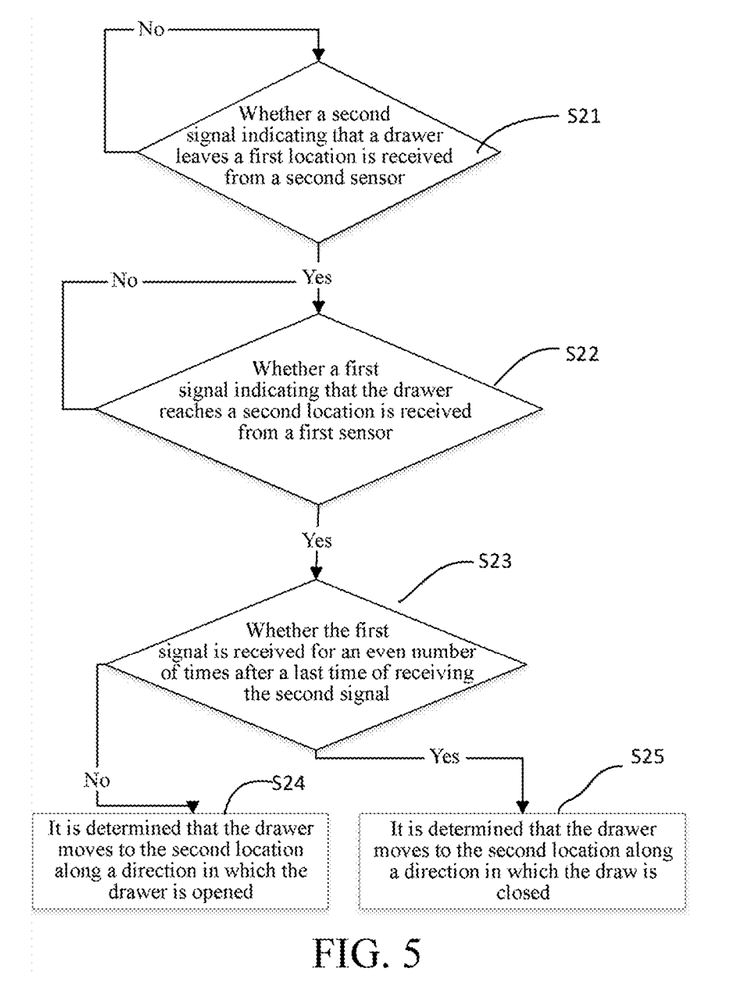
FIG. 5 is a schematic flowchart of a working method according to an embodiment of the present invention.

As shown in FIG. 5, in step S21, the control unit 29 determines whether a second signal indicating that the storage container 5 leaves the first location A1 is received from the second sensor 43. When the storage container 5 is pulled away from the first location A1 from a closed state, the second sensor 43 leaves away from the range of the trigger 42 to generate a second signal.

After the control unit 29 receives the second signal, in step S22, the control unit 29 determines whether a first signal indicating that the storage container 25 reaches the second location A2 is received from the first sensor 41. When the storage container 25 reaches the second location, the first sensor 41 is triggered by the trigger 42 to generate a first signal.

When the control unit 29 receives the first signal, the control unit 29 counts first signals after a last second signal.

In step S23, the control unit 29 determines whether the first signal is received for an even number of times since the last second signal was received. If the control unit 29 receives the first signal for an even number of times after receiving the last second signal, the control unit 29 determines that the storage container 25 moves to the second location A2 along the direction in which the storage container is closed. On the contrary, if the control unit 29 receives the first signal for an odd number of times after receiving the last second signal, the control unit 29 determines that the storage container 25 moves to the second location A2 in the direction in which the storage container is opened.

In some other embodiments, the first sensor of the detecting unit may be a distance sensor ("the first sensor" is referred to as "a distance sensor" in this embodiment below).

As shown in FIG. 2 and FIG. 3, the distance sensor 241 may be fixed to a rear wall 50 of the storage container 5 or located on a rear wall 11 of a first storage compartment 1. In this embodiment, the detecting unit includes a distance sensor 241 fixed to the rear wall 11 of the first storage compartment 1. A distance between the storage container 5 and the location at which the storage container 5 is closed may be obtained by detecting a distance between the storage container 5 and the reference object using the distance sensor 241, so that it may be further determined whether the storage container 5 reaches the second location.

The distance sensor 241 may be, for example, an infrared distance sensor, an ultrasonic distance sensor, or a radar distance sensor.

In some embodiments, after the storage container 5 is opened, when the distance sensor 241 detects, for an even number of times, that the storage container 5 reaches the second location, the control unit 9 determines that the storage container 5 moves to the second location along the direction in which storage container is closed. When the distance sensor 241 detects, for an odd number of times, that the storage container 5 reaches the second location, the control unit 9 determines that the storage container 5 moves to the second location along the opening direction. When the storage container 5 returns to the closing location, the number of times for which the distance sensor 241 detects that the storage container 5 reaches the second location is cleared.

In this embodiment, it may be determined whether the storage container 5 is in a closed state through the distance sensor 241, or a detecting device (for example, the second sensor 43 and the trigger 42) is additionally disposed to detect whether the storage container 5 is in a closed state (the first location).

The control units 9 and 29 control, based on a detection result of the detection unit, the video recording modules 6 and 26 configured to record a video of interiors of the storage containers 5, 25.

The control units 9 and 29 may be disposed in such way that the video recording modules 6 and 26 record a video after the opened storage containers 5 and 25 move to the second location A2 toward the first location (the direction in which the storage container is closed).

Therefore, the second location A2 may become a trigger location.

In some other embodiments, the control unit 9 and 29 may be disposed in such way that the video recording modules 6 and 26 record a video after the opened storage containers 5 and 25 move to the second location A2 toward the third location (the direction in which the storage container is opened).

The control unit 9 and 29 may be further disposed in such way that the video recording module 6 and 26 record a video independent of a movement direction when the storage containers 5 and 25 reach the second location after it is determined that the storage containers 5 and 25 move to the second location A2.

Figure 6:
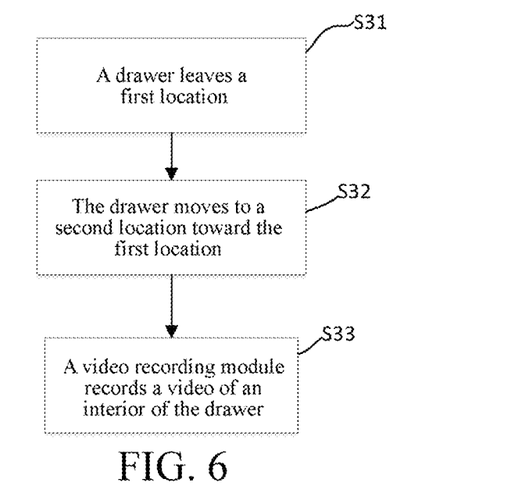
FIG. 6 is a schematic flowchart of a working method according to an embodiment of the present invention.

An exemplary embodiment is described in detail below with reference to FIG. 6.

In step S31, the storage containers 5 and 25 leave the first location A1. This can be obtained through detection using the second sensor 43 or the distance sensor 241.

In step S32, the storage containers 5 and 25 move to the second location A2 along a preset direction. This can be determined by the control units 9 and 29 based on feedback from the detecting unit. That the control units 9 and 29 determine, based on the feedback from the detecting unit, whether the storage containers 5 and 25 reach the trigger location at which the video recording modules 6 and 26 are triggered to record a video may be implemented according to any of the solutions of the foregoing embodiments.

When it is determined that the storage containers 5 and 25 reach the second location, in step S33, the video recording modules 6 and 26 record a video of the interiors of the opened storage containers 5 and 25.

In some embodiments, after it is determined that the storage containers 5 and 25 move to the second location along the direction in which the storage container is closed, the video recording modules 6 and 26 record a video of the interiors of the opened storage containers 5 and 25. In some embodiments, after it is determined that the storage containers 5 and 25 move to the second location along the direction in which the storage container is opened, the video recording modules 6 and 26 record a video of the interiors of the opened storage containers 5 and 25. In other embodiments, regardless of a direction along which the storage containers 5 and 25 move to the second location, the video recording modules 6 and 26 record a video of the interiors of the storage containers 5 and 25.

The control units 9 and 29 may generate an instruction to trigger the video recording modules 6 and 26 to record a video of the interiors of the storage containers 5 and 25 immediately after determining that the storage containers 5 and 25 move to the second location along the predetermined direction. In some other embodiments, the control units 9 and 29 starts counting when determining that the storage containers 5 and 25 move to the second location along the predetermined direction, and the video recording modules 6 and 26 record a video of the interiors of the storage containers 5 and 25 after a predetermined duration.

In some embodiments, after step S31, the video recording modules 6 and 26 may enter a standby mode from a sleep mode to prepare for video recording.

In some embodiments, after step S31, illumination units 7, 27 may be enabled to improve an illumination state within the storage containers 5 and 25 or to improve quality of video recording.

In some embodiments, the illumination unit 27 may be disposed at a bottom of another door 24 located above the door 23 (shown in FIG. 4).

In some other embodiments, as shown in FIG. 1 to FIG. 3, the illumination unit 7 is disposed at the connecting portion 103, faces toward the front of the cabinet 101, and is inclined downward to illuminate the interior of the storage container 5 that is at least partially pulled out of the storage compartment. A recessed portion 61 may extend along an entire width of the connecting portion 103, and the illumination unit 7 and the video recording module 6 are located in a same recessed portion 61. The illumination unit 7 and the video recording module 6 may be separately assembled on a mounting inclined wall 62, or the illumination unit 7 and the video recording module 6 are mounted in the recessed portion 61 after forming a pre-assembled unit. In an alternative embodiment, the illumination unit 7 and the video recording module 6 are respectively located within different recessed portions 61 that are disposed apart.

When the storage containers 5 and 25 are closed, the video recording modules 6 and 26 may enter a sleep mode, and the illumination unit 7 is turned off.

Photographs obtained using the video recording modules 6 and 26 may be sent to a cloud server through a communication module.

Figure 7:
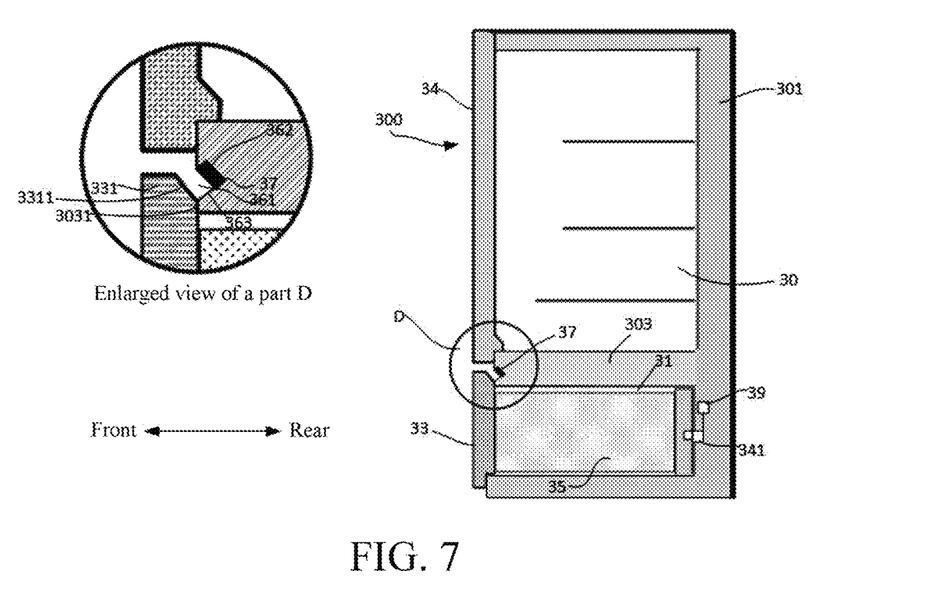
FIG. 7 is a schematic cross-sectional view of a refrigerator according to still another embodiment of the present invention.

FIG. 7 is a schematic cross-sectional view of a refrigerator according to still another embodiment of the present invention. As shown in FIG. 7, a refrigerator 300 includes a cabinet 301, the cabinet 301 defining a storage compartment 31, a pair of oppositely disposed side walls 30, and a connecting portion 303 that extends along a lateral direction of the cabinet and that is connected to the pair of side walls 30. The connecting portion 303 has a front engaging face 3031. The refrigerator 300 includes a door 33 for configured to cover the storage compartment 31, the door 33 being connected to the front engaging face 3031 when being closed.

The refrigerator 300 may include another door 34 located above the door 33. The door 34 is engaged with the connecting portion 303 when being closed.

The refrigerator 300 includes a storage container 35. The storage container 35 is located in the storage compartment 31 and may be at least partially pulled out of the first storage compartment 31.

The refrigerator 300 includes an illumination module 37, the illumination module 37 being disposed at the connecting portion 303, facing toward a front of the cabinet 301, and is inclined downward to illuminate the storage container 35 that is at least partially pulled out of the storage compartment 31.

A front end of the connecting portion 303 may include a recessed portion 361, the illumination module 37 being located in the recessed portion 361. The recessed portion 361 may be recessed rearward from a front surface of the connecting portion 303.

The connecting portion 303 includes a mounting inclined wall 362, the mounting inclined wall 362 being inclined downward in a front-to-rear direction and being inclined frontward and downward. The illumination module 37 is coupled to the mounting inclined wall 362.

The recessed portion 361 may include a lower wall 363 opposite to the mounting inclined wall, the lower wall 363 being inclined upward in a front-to-rear direction to be inclined frontward and upward. This helps enlarge an illumination range of the illumination module 37. In this embodiment, the recessed portion 361 has a section that is approximately "V".

In order to avoid a collision between the door 33 and the illumination module 37, there is an interval between a rear portion of the door 33 and the illumination module 37. An upper end of the door 33 has a reduced thickness at the corresponding illumination module 37, so that a giving-way portion 331 that retreats toward the front of the cabinet 3101 in a bottom-to-top direction is formed. The giving-way portion 331 may include a rear surface 3331 that is located on an upper rear side of the door 33 and that is gradually inclined toward a direction away from the connecting portion 103.

When the door 33 is closed, the illumination module 37 is located outside the storage compartment 31. The illumination module 37 may include a portion located in a gap between the doors 33 and 34 in a vertical direction.

The refrigerator 300 includes a control unit 39, the control unit 39 being disposed in such way that when the storage container 35 is opened, the illumination module 37 is turned on to illuminate the opened storage container 35. In the embodiment in which the storage container 35 moves with the door 35, the control unit 39 may determine, according to a determined fact that the door 35 is opened, that the storage container 35 is opened. In the embodiment in which the storage container 35 can move relative to the door 35, the control unit 39 may detect, according to an additional sensor 341 (for example, a magnetic sensor or a mechanical switch), whether the storage container 35 is at a closed location.

The invention claimed is:

1. A refrigerator, comprising:
a cabinet having a storage compartment, a pair of oppositely disposed side walls, and a connecting portion that extends along a lateral direction of the cabinet and that is connected to the pair of side walls, the connecting portion having an inclined wall and a front engaging face disposed below the inclined wall and forward of a bottom edge of the inclined wall toward a front of the refrigerator;
a door, configured to cover the storage compartment, the door engaging the front engaging face when closed;
a storage container or movable shelf that is located in the storage compartment and that may be at least partially pulled out of the storage compartment; and
a video recording module or an illumination module, wherein the video recording module or the illumination module is disposed on said inclined wall, faces toward a front of the cabinet, and is inclined downward to record a video of/illuminate the storage container or movable shelf that is at least partially pulled out of the storage compartment.

2. The refrigerator according to claim 1, wherein the inclined wall faces toward the front of the cabinet and is inclined downward in a front-to-rear direction.

3. The refrigerator according to claim 1, wherein the connecting portion comprises a recessed portion, the video recording module or the illumination module being located in the recessed portion.

4. The refrigerator according to claim 3, wherein the recessed portion is recessed rearward from the front engaging face of the connecting portion.

5. The refrigerator according to claim 3, wherein the recessed portion includes a lower wall below the inclined wall, the lower wall is inclined upward in a front-to-rear direction and connects the inclined wall to the front engaging face.

6. The refrigerator according to claim 1, wherein there is an interval between a rear portion of the door and the video recording module or the illumination module.

7. The refrigerator according to claim 1, wherein there is a giving-way portion at a rear side of an upper end of the door, and the door has a reduced thickness at the giving-way portion, the reduced thickness being reduced relative to a thickness of other areas of the door.

8. The refrigerator according to claim 1, wherein there is a surface inclined toward a direction away from the connecting portion at a rear side of the upper end of the door.

9. A refrigerator, comprising:
a cabinet having a storage compartment, a pair of oppositely disposed side walls, and a connecting portion that extends along a lateral direction of the cabinet and that is connected to the pair of side walls, the connecting portion having a front engaging face;
a door, configured to cover the storage compartment, the door engaging the front engaging face when closed;
a storage container or movable shelf that is located in the storage compartment and that may be at least partially pulled out of the storage compartment; and
a video recording module or an illumination module, wherein the video recording module or the illumination module is disposed at the connecting portion, faces toward a front of the cabinet, and is inclined downward to record a video of/illuminate the storage container or movable shelf that is at least partially pulled out of the storage compartment;
the front engaging face is located below the video recording module or the illumination module.

10. A refrigerator, comprising:
a cabinet having a storage compartment, a pair of oppositely disposed side walls, and a connecting portion that extends along a lateral direction of the cabinet and that is connected to the pair of side walls, the connecting portion having a front engaging face;
a door, configured to cover the storage compartment, the door engaging the front engaging face when closed;
a storage container or movable shelf that is located in the storage compartment and that may be at least partially pulled out of the storage compartment; and
a video recording module or an illumination module, wherein the video recording module or the illumination module is disposed at the connecting portion, faces toward a front of the cabinet, and is inclined downward to record a video of/illuminate the storage container or movable shelf that is at least partially pulled out of the storage compartment, the video recording module or the illumination module is located outside the storage compartment when the door is closed.

11. The refrigerator according to claim 1, wherein the door is a first door and further comprising a second door located above the first door, wherein the video recording module or the illumination module is at least partially located between the first door and the second door in a vertical direction.

12. The refrigerator according to claim 1, wherein the storage container or movable shelf is adapted to move in a front-to-rear direction with the door.

13. The refrigerator according to claim 1, further comprising a first sensor for detecting whether the storage container or movable shelf reaches a second location, wherein a spacing exists between the second location and a first location, the storage container being covered or the movable shelf being at an end position within the storage compartment at the first location, and when the storage container or movable shelf reaches the second location along a predetermined direction, the video recording module or the illumination module being triggered to record a video of or illuminate the storage container or movable shelf.

14. The refrigerator according to claim 13, wherein the first sensor is adapted to move with the storage container or movable shelf, or is located in the storage compartment and may move relative to the storage container or movable shelf.

15. The refrigerator according to claim 13, wherein the second location is located between the first location and a third location, the storage container or movable shelf being in a maximum open state at the third location.

16. The refrigerator according to claim 15, wherein the second location is adjacent the third location.

\* \* \* \* \*